UNITED STATES PATENT OFFICE.

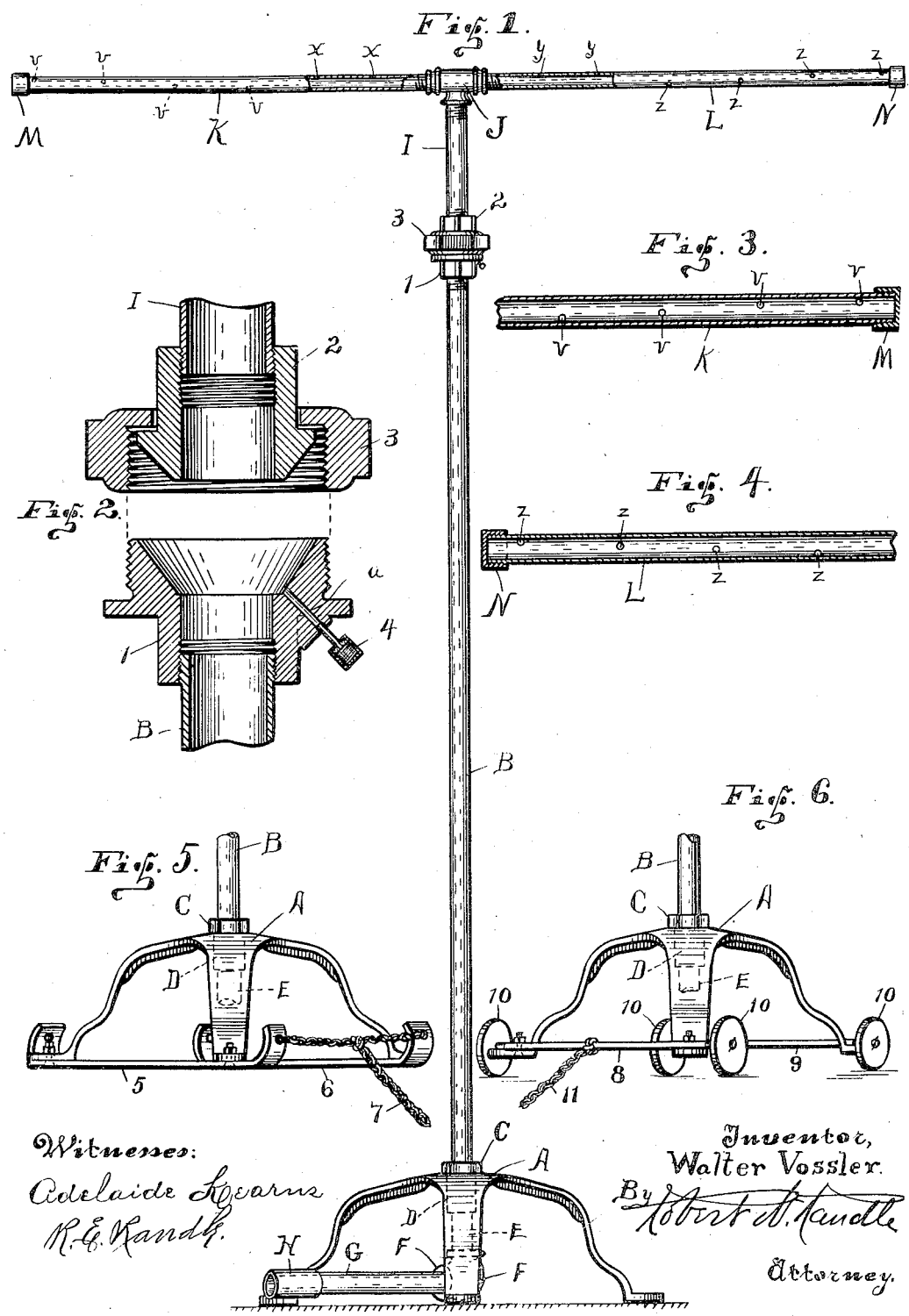

WALTER VOSSLER, OF RICHMOND, INDIANA.

LAWN-SPRINKLER.

935,071.

Specification of Letters Patent.   Patented Sept. 28, 1909.

Application filed November 2, 1908.  Serial No. 460,652.

*To all whom it may concern:*

Be it known that I, WALTER VOSSLER, a citizen of the United States, residing in the city of Richmond, in the county of Wayne, and in the State of Indiana, have invented certain new and useful Improvements in Lawn-Sprinklers, of which the following is a full, clear, and comprehensive specification.

My present invention relates to an automatic rotary lawn sprinkler, in which the operation is actuated by the water as it seeks the exit.

My object in this invention, broadly speaking, is to provide a lawn-sprinkler which is neat and attractive in appearance, strong and durable in construction, highly efficient and practical in operation, and which after being connected to the water supply will be entirely automatic in operation.

A further object is to provide a lawn sprinkler having a relatively stationary vertical stem, a pair of oppositely disposed horizontal arms rigidly connected together, with means whereby the arms may revolve horizontally, a swivel union for connecting the revolving portions to the stem, a base supporting said parts, and having means whereby the whole may be easily moved from place to place over a lawn. And, finally, my object is to provide a lawn sprinkler of simple and inexpensive construction and which can be manufactured and sold at a comparatively low price, and which will be highly ornamental in practice.

Other objects and particular advantages of my invention will suggest themselves in the course of the following description.

The preferred manner for carrying out said objects in a mechanical manner is shown most clearly in the accompanying drawings, in which—

Figure 1 is a side elevation of my entire construction, showing certain portions broken away to display the interior of the arms. Fig. 2 shows an enlarged detail view of my swivel coupling, the major parts being separated in order to more clearly show the construction and the arrangement of the interior thereof. Figs. 3 and 4 are enlarged detail sectional views of the outer portions of the two arms. Fig. 5 shows the base as mounted on runners. And Fig. 6 shows the base as mounted on wheels.

Similar indices denote like parts throughout the several views.

In order that my invention may be more fully understood I will now take up a description thereof and will set forth the construction and operation as briefly and as comprehensively as I may.

My invention contemplates a base A, which includes four outward and downwardly diverging legs, each of the legs terminating in a flat horizontal foot adapted to rest flat upon a level surface. Formed vertically through each of said feet is a bolt aperture, as shown in Fig. 1, which are for the purpose hereinafter set forth.

In the center of the base A is formed a comparatively large aperture, through which may freely pass the lower portion of the pipe B. The lower portion of said pipe B is threaded on its periphery and a nut C is run on said threaded portion, after which the lower end of the pipe B is inserted through said aperture in the base, with said nut resting on top of the base, as shown. A coupling D is then screwed on the lower end of the pipe B, after which the nut C is run down until the base is clamped between the nut and said coupling, thereby rigidly connecting the pipe B and the base A in position shown in Figs. 1, 5 and 6. A nipple E may now be inserted in the coupling D, and an elbow F is then threaded on said nipple. Secured in said elbow is a pipe G extending out near the surface of the ground and at right angles to the pipe B, and having on its outer end the coupling H to which an ordinary water hose may be attached in any well known manner.

The upper end of the pipe B is threaded, exteriorly, to receive the swivel coupling or union, which I will now describe: Said union is composed of essentially three members,—the lower or female member 1; the upper or male member 2; and the connecting band 3. In the contact face of member 1 there is formed a tapering seat to snugly receive therein the taper portion of the member 2. The member 2 is formed with a head which is adapted to be seated in member 1 and there retained in revoluble position by the band 3. The periphery of the member 1 is threaded to coact with the interior threads of the band 3, there being a flange formed around the lower portion of member 1 with which the lower edge of the band 3 may contact, thereby preventing the band from drawing the member 2 into too close a contact with member 1, but allowing them to revolve independent of each other, with the bevel of member 2 sliding in contact with the bevel of member 1. It is to be understood that a central aperture is formed through the union to allow a flow of water therethrough from the pipe B, and the construction of the union is such that the upper member of the union may revolve while at the same time a water tight connection is formed between the members of the union.

Threaded in the upper end of member 2, and extending upward in alinement with pipe B, is the pipe I. Threaded on the upper end of pipe I is the T-fitting J.

Extending out in opposite directions from the fitting J are the two pipe arms K and L, which have their outer ends closed by the respective caps M and N. It should be understood that the arms K and L have interior connection through the fitting J, the pipe I, the union, and the pipe B, to the water supply.

Openings $x$ and $x$ are formed through the arm K, and like openings $y$ and $y$ are formed through the arm L, which openings are directed upward, and they are located near the fitting J, as shown in Fig. 1. And openings $z$, $z$, $z$ and $z$ are formed in one side of the arm K, which openings are not in line with each other but are located spirally as shown. Also openings $v$. $v$. $v$ and $v$ are formed in one side of the arm L, which openings are not in line with each other but are located spirally as shown. As viewed in Fig. 1 the openings $z$ are on the opposite side from the openings $v$, that is they are directed oppositely thereto. Said openings in the arms K and L are graduated, that is they are of varying dimensions, in order that the water may pass through all with substantially equal force, or otherwise as desired.

Disposed through the member 1 of the union is an oil duct $a$ which leads from the exterior and opens into the bevel face of the member 1, as shown in Fig. 2. A force-feed oiler 4 is screwed in and extends out from said duct, whereby oil may be forced into the bevel contact faces of the members 1 and 2.

Should it be desired to place the sprinkler on runners, then I have only to attach the runners 5 and 6 by bolts to the feet of the base A, as shown in Fig. 5, and a chain or rope 7 may be attached thereto and extend out some distance in order that the sprinkler may be moved over the lawn without the operator coming within the radius of the sprinkler. Or, in place of said runners, I may secure the axles 8 and 9 to the feet of the base A, as shown in Fig. 6, mounting the wheels 10 on the axles, and then attaching the rope or chain 11 to one of the axles for the purpose of moving the sprinkler over the lawn.

In practice the water is turned into the device through the pipe G and passes up through the pipe B and pipe I into the arms K and L, and escapes through the apertures $x$, $y$, $z$ and $v$ in fine streams. The escape of the water through the apertures $z$ and $v$ under pressure will cause the arms K and L to revolve at a speed depending on the pressure. As the water is discharged from said apertures it descends to the ground in drops simulating rain, and the water is evenly distributed over a comparatively large extent of surface.

Having now fully shown and described my invention, what I claim and desire to secure by Letters Patent of the United States, is—

A lawn sprinkler substantially as set forth, comprising a base; a vertical pipe secured to and extending up from the base; means for connecting a flexible water supply pipe to the lower end of said pipe; a union attached to the upper end of said pipe,—said union comprising a female member having a beveled concave face, a male member having a beveled head adapted to fit said face in the female member, a band connecting the female and the male member to form a water-tight joint but allowing the male and the female members to revolve independent of each other; a force-feed oiler extending into said band to supply oil to the contacting faces of said male and female members; a second pipe extending up from said union; pipe arms extending out at right angles from the upper end of the last named pipe, said arms each being provided with a plurality of escape apertures formed therein to allow water to escape therefrom both outwardly and upwardly at right angles therefrom; runners removably mounted to the base; means whereby wheels may be employed in place of said runners; and means whereby the device may be operated over the lawn by a person located at a distance from the device, all substantially as shown and described.

In testimony whereof I have hereunto subscribed my name to this specification in the presence of two subscribing witnesses.

WALTER VOSSLER.

Witnesses:
R. N. RANDLE,
R. E. RANDLE.